(12) United States Patent
Chang et al.

(10) Patent No.: US 8,740,428 B2
(45) Date of Patent: Jun. 3, 2014

(54) INDIRECT ILLUMINATION DEVICE FOR VEHICLE

(75) Inventors: Hong Sik Chang, Hwaseong-si (KR); Jung Hoon Woo, Hwaseong-si (KR); Jung Hwan Yun, Seoul (KR); Joo Ha Kim, Suwon-si (KR); Young Jin You, Yongin-si (KR)

(73) Assignees: Hyundai Motor Company, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 13/534,920

(22) Filed: Jun. 27, 2012

(65) Prior Publication Data
US 2013/0148370 A1   Jun. 13, 2013

(30) Foreign Application Priority Data

Dec. 9, 2011   (KR) .................. 10-2011-0131874

(51) Int. Cl.
*F21V 1/00*   (2006.01)
*F21V 11/00*   (2006.01)
*F21V 9/00*   (2006.01)

(52) U.S. Cl.
USPC ........... 362/509; 362/459; 362/510; 362/511; 362/512

(58) Field of Classification Search
None
See application file for complete search history.

(56) References Cited

FOREIGN PATENT DOCUMENTS

| JP | 2002-100213 A | 4/2002 |
| JP | 3146553 U | 10/2008 |
| JP | 2009-230996 A | 10/2009 |

OTHER PUBLICATIONS

English machine translation of JP 2009-230996 (Okada).*

* cited by examiner

*Primary Examiner* — Natalie Walford
(74) *Attorney, Agent, or Firm* — Morgan, Lewis & Bockius LLP

(57) ABSTRACT

An indirect illumination device for a vehicle may include an internal panel forming a diffusion portion in a surface thereof, a light guide plate faced with the diffusion portion, a light source provided in a side portion of the light guide plate to which the light guide plate may be not faced with the diffusion portion, to irradiate light to an inside of the light guide plate, and an external panel provided with guide ribs protruding from a surface of the external panel, wherein the guide ribs support a lateral side of the internal panel and the light guide plate.

8 Claims, 2 Drawing Sheets

INDIRECT ILLUMINATION DEVICE FOR VEHICLE

CROSS-REFERENCE TO RELATED APPLICATION

The present application claims priority to Korean Patent Application No. 10-2011-0131874 filed on Dec. 9, 2011, the entire contents of which is incorporated herein for all purposes by this reference.

BACKGROUND OF THE INVENTION

1. Field of the Invention

The present disclosure relates to an indirect illumination device for a vehicle for accurately setting a position of a light guide plate, reducing an assembling tolerance, and reducing the number of parts using diffusion ink instead of a diffusion sheet, preventing uneven distribution of light by limiting the assembling position of the light guide plate disposed in the inside of the indirect illumination device.

2. Description of Related Art

Recently, as the automotive industry evolves, driving performance of the vehicle is gradually improved, and various convenience device and safety device are on an introducing trend in the inside and outside of the vehicle to provide the convenience and safety of operation.

Further, as the quality of life is gradually enriched with a higher penetration of the vehicle, the vehicle's design has established as one of important purchase factor when purchasing the vehicle. Accordingly, the design of automobile has led to a growing trend of higher quality to promote purchasing power of the vehicle while meeting the demand of consumers.

As one way for luxuriously decorating the interior of the automobile, the indirect illumination device is provided in an indicator cover, a tray cover, a cup holder, a garnish etc. disposed in the vehicle to improve discrimination at night and to emit soft lighting.

Among this, the garnish is attached to the crash pad type and/or the trim type, and the surface thereof is provided with a wood grain film or is painted, thereby to more luxuriously decorate design of the interior.

On the other hand, FIG. 1 shows a structure of the indirect illumination device disposed in above parts, on a top of a base 1, a diffusion sheet 2 is provided, a light guide plate 3 of the diffusion sheet 2 is provided, a light source 4 is provided in one side of the light guide plate 3 to irradiate light from the side surface of the light guide plate 3.

Further, the top of the light guide plate 3 is disposed with a cover 5 forming an appearance. That is, the light irradiated from the light source 4 may emit into the outside of the cover 5 while being evenly diffusing through the light guide plate 3 and the diffusion sheet 2.

However, the structure of the indirect illumination device disposed in flat portion is not greatly limited in the above-described related art, but when applying to the structure to be curved or twisted such as the garnish portion of the crash pad or the door trim shown in FIG. 6, the problem occurs on the quality of the illumination.

That is, when the shape of a cover is bent or twisted, the light guide plate provided in the inside thereof is also bent or twisted. However, the assembling position of the light guide plate may not be accurately set according to a curvature of the cover due to the nature of structure of the light guide plate, thereby to generate excessive tolerance due to the installation position and the assembling of the light guide plate, such that the uneven distribution of the light occurs in the curve portion.

Further, the light guide plate and the diffusion sheet are bent wherein the wrinkle and folding occur due to the difference in the curvature of the inside and outside thereof in the inside of the diffusion sheet. Therefore, the light distributed into the diffusion sheet is also unevenly distributed, thereby to generate phenomenon to be concentrated with the light source in some section.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an indirect illumination device for a vehicle for accurately setting a position of a light guide plate, and reducing an assembling tolerance by limiting the assembling position of the light guide plate in the inside of a curve panel disposed with the indirect illumination device.

In another aspect, the present invention provides an indirect illumination device for a vehicle for reducing the number of parts using diffusion ink instead of a diffusion sheet, and preventing uneven distribution of light due to the folding of the diffusion sheet.

In an aspect of the present invention, an indirect illumination device for a vehicle may include an internal panel forming a diffusion portion in a surface thereof, provided in a portion requiring an illumination at a body and formed according to a shape of a section disposed with an illumination, a light guide plate faced with the diffusion portion and configured to be modified according to the shape of the internal panel, a light source provided in a side portion of the light guide plate and irradiating light to an inside of the light guide plate, and an external panel provided to surround the outside of the internal panel and the light guide plate, formed with a guide rib in the inside thereof, for limiting a position of the light guide plate while supporting the light guide plate by the guide ribs.

The internal panel, the light guide plate, and the external panel are curved and are implemented in a curved portion requiring the illumination.

The light guide plate may have a flat plate type.

The guide ribs are formed plurally.

The diffusion portion is painted to the internal panel with diffusion ink.

In another aspect of the present invention, an indirect illumination device for a vehicle may include an internal panel forming a diffusion portion in a surface thereof, a light guide plate faced with the diffusion portion, a light source provided in a side portion of the light guide plate to which the light guide plate is not faced with the diffusion portion, to irradiate light to an inside of the light guide plate, and an external panel provided with guide ribs protruding from a surface of the external panel, wherein the guide ribs support a lateral side of the internal panel and the light guide plate.

The guide ribs are spaced each other along the light guide plate and/or the internal plate.

The light guide plate is in shape of flat strip with uniform thickness.

The light guide plate is bendable.

The diffusion portion is painted to the internal panel with diffusion ink.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
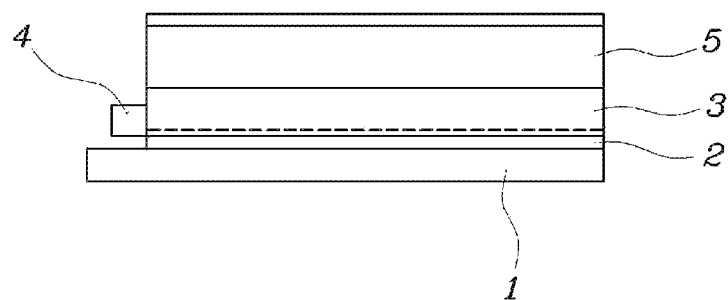
FIG. 1 is a cross-sectional view for describing a structure of an indirect illumination device for a vehicle in the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
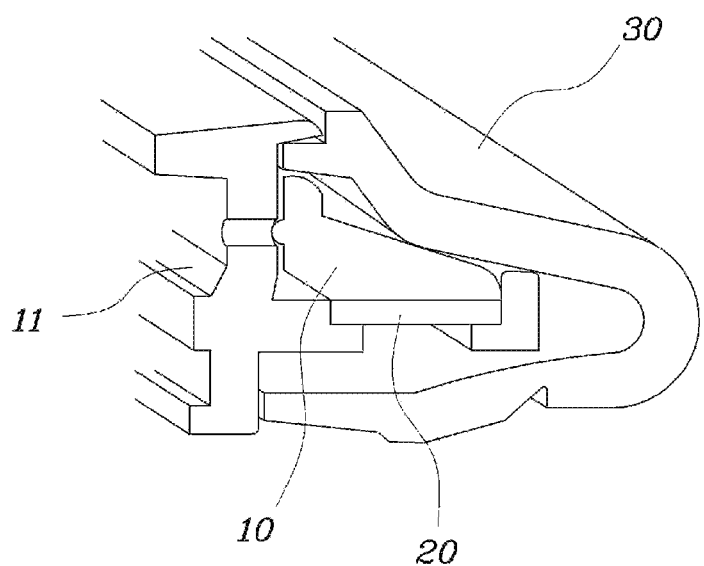
FIG. 2 is a view showing an assembling shape of the indirect illumination device for the vehicle according to the invention.
Figure 3:
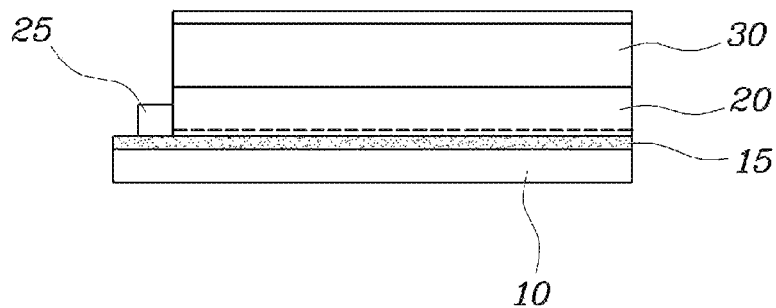
FIG. 3 is a cross-sectional view schematically showing a coupling structure of the indirect illumination device for the vehicle according to the invention.
Figure 4:
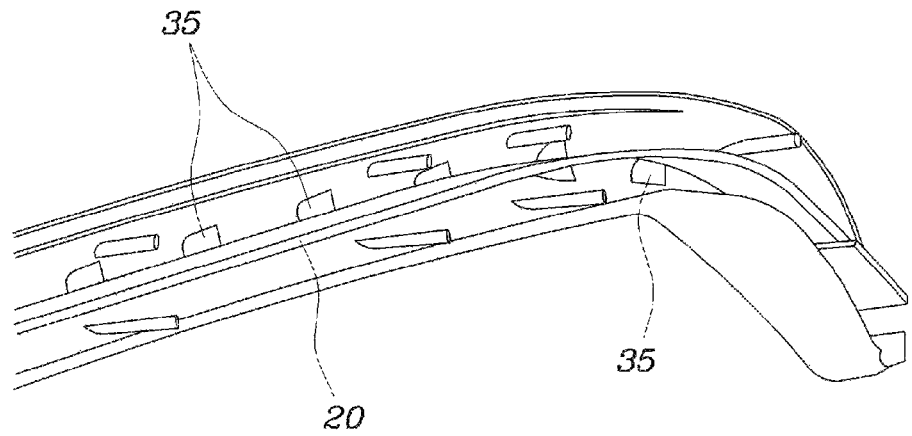
FIG. 4 is a prospective view showing a shape of an external panel, provided with a light guide plate, in the invention.
Figure 5:
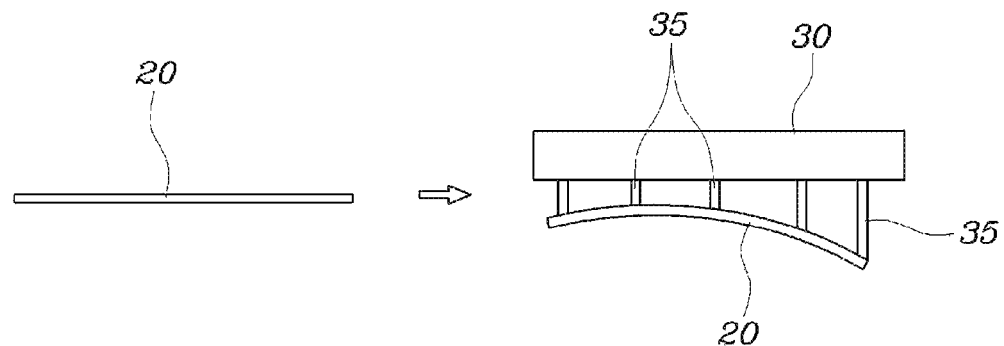
FIG. 5 is a view conceptually showing an action to be limited with the light guide plate by guide ribs formed in an external panel of the invention.
Figure 6:
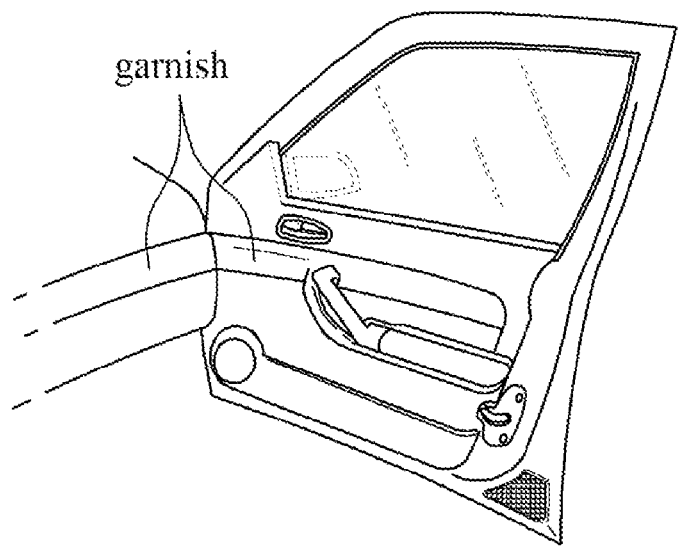
FIG. 6 is a view showing an example applying an indirect illumination device for the vehicle according to the invention.

An indirect illumination device for the vehicle of the invention shown in FIGS. 2 to 6 includes an internal panel 10 forming a diffusion portion 15 in one surface thereof, provided in the portion to be needed with an illumination at a body and formed according to a shape of a section disposed with an illumination, a light guide plate 20 provided to be faced with the diffusion portion 15 and formed according to the shape of the internal panel 10, a light source 25 provided in a side portion of the light guide plate 20 and irradiating light to an inside of the light guide plate 20, and an external panel 30 provided to surround the outside of the internal panel 10 and the light guide plate 20, formed with a guide ribs 35 in the inside thereof, and therefore, limiting a position of the light guide plate 20 while supporting the light guide plate 20 by the guide ribs 35.

Here, the internal panel 10, which is fixed at a body side, may be directly fixed at the body, but a base plate 11 is fixed at the internal panel 10, such that the base plate 11 may be disposed to be fixed at the body.

Further, diffusion ink may be printed in a pattern shape separately with the diffusion portion 15 in one surface of the light guide plate 20 facing the internal panel 10.

Further, the light source 25 may use a LED, and may be disposed in both ends of the light guide plate 20.

In addition, the external panel 30 may be a garnish disposed in a crash pad or a door trim in the vehicle and may be also applied to various vehicle internal parts using the indirect illumination. Further, painting and insert film may be printed or coated for beauty and luxury of decorations in the surface of the external panel 30.

That is, with above configuration, the guide ribs 35 is formed in the inside of the external panel 30, the guide ribs 35 supports the light guide plate 20, and therefore, disposing position of the light guide plate 20 may be limited. Therefore, assembling and disposing position of the light guide plate 20 are set accurately, such that an assembling tolerance is reduced and the light is diffused evenly to enhance the evenness of luminance.

In the invention, the internal panel 10, the light guide plate 20 and the external panel 30 are curved, and therefore, may be implemented in the curved surface portion requiring the illumination.

That is, since the guide ribs 35 formed in the external panel 30 supports appearance surface of the light guide plate 20, the disposing position of the light guide plate 20 is limited to a twisting portion or a continuously bent curved surface portion in the vehicle requiring the indirect illumination, such that the light may be evenly diffused even in the curved surface portion.

In addition, in the invention, the light guide plate 20 has a flat plate shape, and the assembling position thereof may be limited while being modifying as the shape curved by the guide ribs 35.

That is, when the shape of the light guide plate 20 is injection-molded in a bent or twisting shape, the use range of the light guide plate 20 is limited and undercut problem on a mold molded with the light guide plate 20 occurs. Therefore, the light guide plate 20 is injection-molded in the shape of the flat plate, such that the undercut problem is easily solved. Particularly, the guide ribs 35 supports the light guide plate 20, thereby to easily limit the disposing position of the light guide plate 20.

In an exemplary embodiment of the present invention, the light guide plate 20 may be in shape of flat strip with uniform thickness.

In the invention, the guide ribs 35 are formed in a plurality of, when the shape of the light guide plate 20 is bent or twisted, the position of the light guide plate 20 may be limited by differently forming each of the shapes of the guide ribs 35 to be corresponded to the appearance of the light guide plate 20.

That is, the light guide plate 20 provided in the inside of the external panel 30 is twisted or bent, and therefore, the interval between the light guide plate 20 and the inside of the external panel 30 may not be uniformed. Therefore, the guide ribs 35 are provided plurally and the height and shape etc. of each guide rib 35 may be differently applied according to the interval between the guide ribs 35 and the light guide plate 20, such that the position of the light guide plate 20 may be more easily limited and more accurate assembling for the light guide plate 20 may be enabled.

In an exemplary embodiment of the present invention, 7, the guide ribs 35 may be spaced each other along the light guide plate 20 and/or the internal plate 10.

In the invention, the diffusion portion 15 may be painted on the internal panel 10 with the diffusion ink or the diffusion paint. That is, existing diffusion sheet is removed, and the diffusion ink is painted or printed on the internal panel 10, thereby to reduce the number of parts, save the production cost, and improve the assembly performance and productivity of the indirect illumination device.

Further, the diffusion unbalance of the light according to the folding of the diffusion sheet may be solved in the portion to be abruptly formed with change of the section by removing the diffusion sheet.

Actions and effects of the invention will be described in detail.

In the indirect illumination device for the vehicle of the invention which may be disposed in the crash pad or the door trim, the diffusion portion 15 is formed in the internal panel 10, the light guide plate 20 is provided to be faced with the diffusion portion 15, and the external panel 30 is provided in the shape surrounding the outside of the light guide plate 20 and the internal panel 10. That is, the external panel 30 may be the garnish disposed in the outside of the crash pad or the door trim.

Like this, the garnish is disposed for the indirect illumination in the interior material disposed in the vehicle of the invention, the light guide plate 20 is supported by the guide ribs 35 formed in the inside of the external panel 30, and the disposing position is fixed and limited, thereby to accurately set the assembly and disposing position of the light guide plate 20, to minimize the assembly tolerance, and to evenly diffuse and distribute the light.

Further, in the invention, the disposing position of the light guide plate 20 formed in a flat plate is limited while being modified into the bent or twisted three dimensional curve shape by the guide ribs 35, thereby to easily mold the light guide plate 20 and to simply implement three dimensional light guide plate 20.

Further, instead of the existing diffusion sheet in the invention, the diffusion ink is painted to the internal panel 10, thereby to reduce the number of parts, save the production cost of the indirect illumination device, and improve the assembly performance and productivity of the indirect illumination device. Further, although the diffusion portion 15 is painted and the internal panel 10 is curved, it is possible to evenly diffuse and distribute the light without generating the folded portion in the diffusion portion 15.

According to an exemplary embodiment of the present invention, the light guide plate is supported by the guide ribs formed in the inside of the external panel, thereby to fix and limit the disposing position, such that the disposing position and the assembling of the light guide plate are accurately set, the assembling tolerance may be minimized, and the light may be evenly diffused and distributed.

Further, the disposing position of the light guide plate formed in a flat plate is limited while being modified into a bent or twisted three dimensional curve shape by the guide ribs, thereby to easily mold the light guide plate and to easily and simply implement three dimensional shape of the light guide plate.

Further, the diffusion ink instead of the diffusion sheet is painted on the internal panel, thereby to reduce the number of parts due to removal of the assembling process of the diffusion sheet, save the production cost, and improve the assembly performance and productivity. Further, although the internal panel is curved, the folded portion is not generated in the diffusion portion, thereby to evenly diffuse and distribute the light.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An indirect illumination device for a vehicle comprising:
an internal panel forming a diffusion portion in a surface thereof, provided in a portion requiring an illumination at a body and formed according to a shape of a section disposed with an illumination;
a light guide plate faced with the diffusion portion and configured to be modified according to the shape of the internal panel;
a light source provided in a side portion of the light guide plate and irradiating light to an inside of the light guide plate; and
an external panel provided to surround the outside of the internal panel and the light guide plate, formed with a guide rib in the inside thereof, for limiting a position of the light guide plate while supporting the light guide plate by the guide ribs;
wherein the diffusion portion is painted to the internal panel with diffusion ink.

2. The indirect illumination device for the vehicle of claim 1, wherein the internal panel, the light guide plate, and the external panel are curved and is implemented in a curved portion requiring the illumination.

3. The indirect illumination device for the vehicle of claim 2, wherein the light guide plate has a flat plate type.

4. The indirect illumination device for the vehicle of claim 1, wherein the guide ribs are formed plurally.

5. An indirect illumination device for a vehicle comprising:
an internal panel forming a diffusion portion in a surface thereof,
a light guide plate faced with the diffusion portion;
a light source provided in a side portion of the light guide plate to which the light guide plate is not faced with the diffusion portion, to irradiate light to an inside of the light guide plate; and an external panel provided with guide ribs protruding from a surface of the external panel, wherein the guide ribs support a lateral side of the internal panel and the light guide plate;

wherein the diffusion portion is painted to the internal panel with diffusion ink.

6. The indirect illumination device for the vehicle of claim 5, wherein the guide ribs are spaced each other along the light guide plate and/or the internal plate.

7. The indirect illumination device for the vehicle of claim 5, wherein the light guide plate is in shape of flat strip with uniform thickness.

8. The indirect illumination device for the vehicle of claim 5, wherein the light guide plate is bendable.

* * * * *